United States Patent
Hsieh

(10) Patent No.: US 11,618,801 B2
(45) Date of Patent: Apr. 4, 2023

(54) PREPOLYMER, RESIN COMPOSITION COMPRISING THE SAME AND ARTICLE MADE THEREFROM

(71) Applicant: Elite Material Co., Ltd., Taoyuan (TW)

(72) Inventor: Chen-Yu Hsieh, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 260 days.

(21) Appl. No.: 17/117,490

(22) Filed: Dec. 10, 2020

(65) Prior Publication Data
US 2022/0153900 A1    May 19, 2022

(30) Foreign Application Priority Data

Nov. 18, 2020 (TW) ................. 109140206

(51) Int. Cl.
| | | |
|---|---|---|
| C08F 283/00 | (2006.01) | |
| C08F 4/80 | (2006.01) | |
| C08G 61/06 | (2006.01) | |
| C08L 65/00 | (2006.01) | |
| C08K 3/16 | (2006.01) | |
| C08G 61/02 | (2006.01) | |

(52) U.S. Cl.
CPC ............. *C08F 283/00* (2013.01); *C08F 4/80* (2013.01); *C08G 61/02* (2013.01); *C08K 3/16* (2013.01); *C08G 61/06* (2013.01); *C08G 2261/12* (2013.01); *C08G 2261/3321* (2013.01); *C08G 2261/3324* (2013.01); *C08K 2003/164* (2013.01); *C08L 65/00* (2013.01); *C08L 2203/20* (2013.01)

(58) Field of Classification Search
CPC ...... C08G 61/00; C08G 61/02; C08G 283/00; C08G 283/02; C08F 283/00; C08F 283/02
See application file for complete search history.

(56) References Cited

U.S. PATENT DOCUMENTS

| | | | | |
|---|---|---|---|---|
| 5,218,049 A | * | 6/1993 | Yamamoto | .............. C08L 65/00 524/505 |
| 5,438,093 A | * | 8/1995 | Stricharczuk | .......... C08G 61/02 525/289 |
| 6,838,489 B2 | * | 1/2005 | Bell | ..................... B01J 31/2265 522/63 |

\* cited by examiner

*Primary Examiner* — Rip A Lee
(74) *Attorney, Agent, or Firm* — Muncy, Geissler, Olds & Lowe, P.C.

(57) ABSTRACT

A prepolymer is prepared by subjecting a compound of Formula (I) and a vinyl-containing compound to a prepolymerization reaction, and a resin composition includes the prepolymer. The vinyl-containing compound includes bis (vinylphenyl) ethane, divinylbenzene, modification of divinylbenzene or a combination thereof. A ratio in part by weight of the compound of Formula (I) to the vinyl-containing compound in the prepolymerization reaction is 8:2 to 6:4. The resin composition includes the prepolymer and an additive, and an article made from the resin composition may include a resin film, a prepreg, a laminate or a printed circuit board.

16 Claims, 1 Drawing Sheet

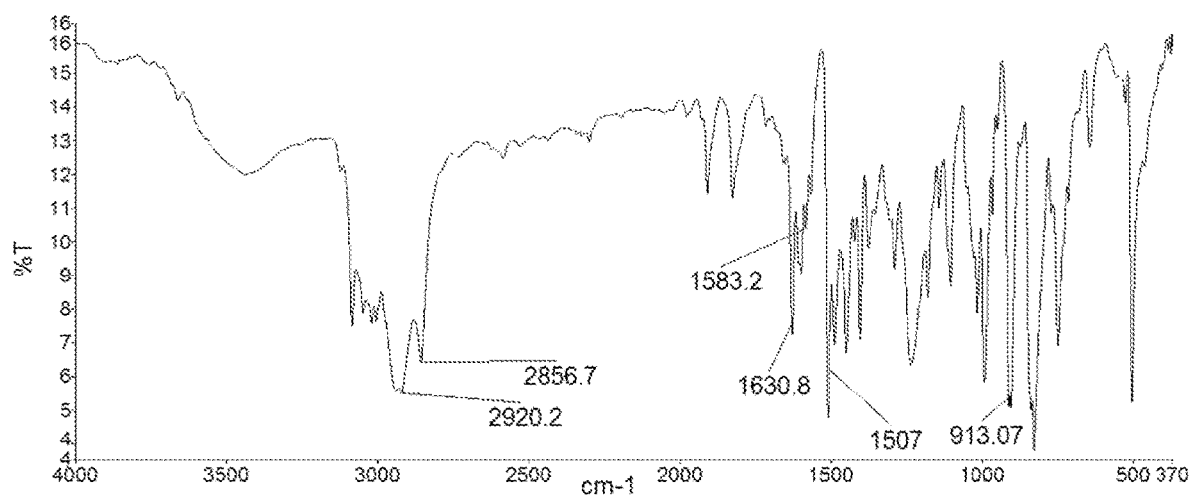

PREPOLYMER, RESIN COMPOSITION COMPRISING THE SAME AND ARTICLE MADE THEREFROM

CROSS-REFERENCE TO RELATED APPLICATION

This application claims the priority benefits of Taiwan Patent Application No. 109140206, filed on Nov. 18, 2020. The entirety the above-mentioned patent application is hereby incorporated by reference herein and made a part of this specification.

BACKGROUND

1. Field of the Disclosure

The present disclosure pertains to the technical field of polymer materials and more particularly to a prepolymer, a resin composition comprising the prepolymer, and an article made from the resin composition.

2. Description of Related Art

With the rapid evolution of electronic technology, data processing of electronic products including mobile communication apparatuses, servers and mainframe computers has been continuously developed towards high frequency signal transmission and high speed digitalization; therefore, low-dielectric materials have become the mainstream for the development of laminates with a high transmission rate so as to meet the demands of high speed data processing.

Conventionally, polytetrafluoroethylene was widely used as the raw material for making a laminate with ultra-low dissipation factor (having a dissipation factor (Df) at 10 GHz of less than or equal to 0.0020). However, polytetrafluoroethylene requires high temperature lamination at above 300° C. and has the problems such as severe processing conditions, difficulty in layer build-up of polytetrafluoroethylene laminates, low adhesion between polytetrafluoroethylene and copper foils and requiring extra resin films to increase copper foil peeling strength, which present the drawbacks of using polytetrafluoroethylene as the raw material for making a laminate with ultra-low dissipation factor.

To address the problems above, polyolefins were also conventionally used as the raw material for making a laminate with ultra-low dissipation factor. However, laminates thus made have the problems of high coefficient of thermal expansion and poor thermal resistance.

Accordingly, there is a need to develop a material for copper-clad laminates that overcomes at least one of the aforesaid technical problems.

SUMMARY

To overcome the problems of prior arts, particularly one or more above-mentioned property demands facing conventional materials, it is a primary object of the present disclosure to provide a prepolymer, a resin composition comprising the prepolymer and an article made from the resin composition, which may achieve at least one desirable property including low dissipation factor (Df), high glass transition temperature (Tg) and low coefficient of thermal expansion.

Specifically, in order to realize the aforesaid object, the inventor of the present application, through exhaustive in-depth research, unexpectedly found that, by prepolymerizing a copolymer of dicyclopentadiene and norbornene and a vinyl-containing compound, the glass transition temperature and T288 thermal resistance of the copolymer of dicyclopentadiene and norbornene can be greatly improved, the coefficient of thermal expansion can be reduced to improve dimensional stability of laminates, and at the same time the copper foil peeling strength can be improved.

To achieve the above-mentioned object, the present disclosure provides a prepolymer prepared by subjecting a compound of Formula (I) and a vinyl-containing compound to a prepolymerization reaction,

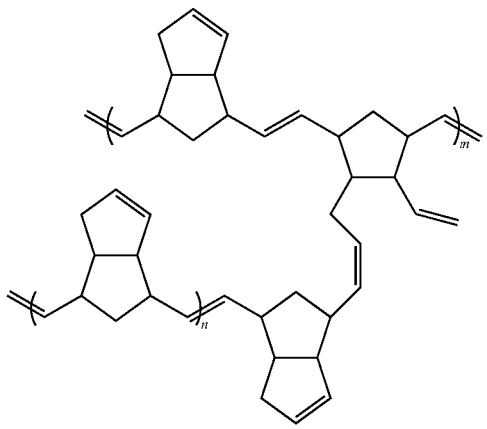

Formula (I)

wherein:

m and n are individually an integer of 1 to 10, such as 1, 2, 3, 4, 5, 6, 7, 8, 9 or 10;

the vinyl-containing compound comprises bis(vinylphenyl) ethane, divinylbenzene, modification of divinylbenzene or a combination thereof; and a ratio in part by weight of the compound of Formula (I) to the vinyl-containing compound in the prepolymerization reaction is 8:2 to 6:4.

For example, in one embodiment, the compound of Formula (I) is a copolymer of dicyclopentadiene and norbornene.

For example, in one embodiment, the modification of divinylbenzene comprises a copolymer, a prepolymer or a derivative of the divinylbenzene and a following component: methyl methacrylate resin, triallyl isocyanurate resin, triallyl cyanurate resin, ethylstyrene or a combination thereof.

For example, in one embodiment, the prepolymerization reaction is performed in the presence of a reaction initiator, and a content of the reaction initiator is 0.001 to 1 part by weight relative to a total of 100 parts by weight of the compound of Formula (I) and the vinyl-containing compound.

For example, in one embodiment, the reaction initiator comprises a Grubbs catalyst, a metal chloride or a combination thereof.

For example, in one embodiment, the Grubbs catalyst comprises (1,3-bis-(2,4,6-trimethylphenyl)-2-imidazolidinylidene)dichloro(o-isopropoxyphenylmethylene)ruthenium, dichloro(o-isopropoxyphenylmethylene)(tricyclohexylphosphine) ruthenium(II) or a combination thereof.

For example, in one embodiment, the metal chloride comprises aluminium chloride.

For example, in one embodiment, the prepolymerization reaction has a conversion rate of between 10% and 90%.

For example, in one embodiment, the prepolymerization reaction is performed at a temperature of 70 to 120° C. for 1 to 8 hours.

In addition, also disclosed herein is a resin composition, which comprises the above-described prepolymer and an additive.

For example, in one embodiment, the resin composition comprises 20 to 108 parts by weight of the additive relative to 100 parts by weight of the prepolymer.

For example, in one embodiment, the additive comprises polyphenylene ether resin, maleimide resin, vinyl-containing polyolefin resin, hydrogenated polyolefin resin, bis(vinylphenyl) ethane, divinylbenzene, modification of divinylbenzene, triallyl isocyanurate, triallyl cyanurate, styrene copolymer or a combination thereof.

For example, in one embodiment, the resin composition further comprises flame retardant, inorganic filler, curing accelerator, solvent, polymerization inhibitor, toughening agent, coupling agent or a combination thereof.

Also disclosed herein is an article made from the resin composition, comprising a resin film, a prepreg, a laminate or a printed circuit board.

For example, in one embodiment, articles made from the resin composition disclosed herein have one, more or all of the following properties:

a dissipation factor at 10 GHz as measured by reference to JIS C2565 of less than or equal to 0.0015;

a glass transition temperature as measured by using a dynamic mechanical analyzer by reference to IPC-TM-650 2.4.24.4 of greater than or equal to 200° C.; and a Z-axis coefficient of thermal expansion as measured by using a thermomechanical analyzer by reference to IPC-TM-650 2.4.24.5 of less than or equal to 50 ppm/° C.

BRIEF DESCRIPTION OF THE DRAWINGS

The sole FIGURE illustrates the FTIR spectrum of Prepolymer 1 obtained from Synthesis Example 1.

DESCRIPTION OF THE EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, the term "comprises," "comprising," "includes," "including," "has," "having," "encompasses," "encompassing," or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features such as values, numbers, contents, amounts or concentrations presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "between 1 and 8" should be understood as explicitly disclosing all subranges such as 1 to 7, 2 to 8, 2 to 6, 3 to 6, 4 to 8, 3 to 8 and so on, particularly subranges defined by integers, as well as disclosing all individual values such as 1, 2, 3, 4, 5, 6, 7 and 8. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$ and/or $X_3$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$," and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

Examples and embodiments are described in detail below. It will be understood that these examples and embodiments are exemplary only and are not intended to limit the scope of the present disclosure. Unless otherwise specified, processes, reagents and conditions described in the examples are those known in the art.

Generally, the present disclosure provides a prepolymer prepared by subjecting a compound of Formula (I) and a vinyl-containing compound to a prepolymerization reaction,

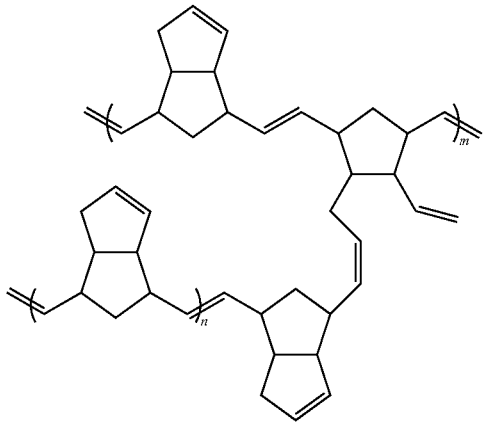

Formula (I)

wherein:

m and n are individually an integer of 1 to 10, such as 1, 2, 3, 4, 5, 6, 7, 8, 9 or 10;

the vinyl-containing compound comprises bi s (vinylphenyl) ethane, divinylbenzene, modification of divinylbenzene or a combination thereof; and a ratio in part by weight of the compound of Formula (I) to the vinyl-containing compound in the prepolymerization reaction is 8:2 to 6:4.

The compound of Formula (I) may comprises a modification of the compound of Formula (I). For example, the modification described above may be derived by replacing the vinyl groups of the compound of Formula (I) with a different functional group, such as by reacting an aminophenol with the compound of Formula (I) to crosslink the amino groups of the aminophenol and the vinyl groups of the compound of Formula (I), such that a part of or all of the vinyl groups of the compound of Formula (I) are substituted by terminal hydroxyl groups, but not limited thereto.

For example, in one embodiment, the compound of Formula (I) comprises a copolymer of dicyclopentadiene and norbornene, examples including but not limited to products available from Materia Inc., such as PROXIMA® resin (a.k.a. Proxima® Thermoset Resins).

In the present disclosure, the vinyl-containing compound comprises bis(vinylphenyl) ethane, divinylbenzene, modification of divinylbenzene or a combination thereof.

For example, in one embodiment, the bis(vinylphenyl) ethane may comprise any one or more isomers such as p,p-divinyl-1,2-diphenylethane (p,p-BVPE, as shown in Formula (II)), m,p-divinyl-1,2-diphenylethane (m,p-BVPE, as shown in Formula (III)) and m,m-divinyl-1,2-diphenylethane (m,m-BVPE, as shown in Formula (IV)). As used herein, p represents para-position and m represents meta-position. For example, in one embodiment, the bis(vinylphenyl) ethane used in the prepolymerization reaction contains between 80% and 99% of para-para vinyl groups. In other words, in 80% to 99% of the bis(vinylphenyl) ethane, the vinyl groups on the vinylphenyl groups are both at the para-position of the benzene rings relative to the group bonded with the vinylphenyl groups. Examples of the bis (vinylphenyl) ethane include:

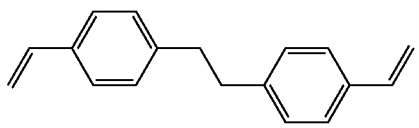

Formula (II)

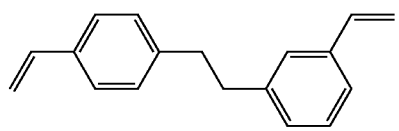

Formula (III)

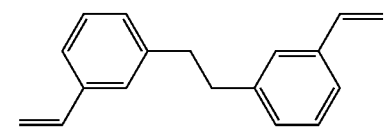

Formula (IV)

In addition, according to the present disclosure, the bis (vinylphenyl) ethane may be present as a monomer and as a polymer of bis(vinylphenyl) ethane, both of which may participate the prepolymerization reaction with the compound of Formula (I). Polymers of bis(vinylphenyl) ethane may include, but not limited to, a dimer or a trimer of the bis(vinylphenyl) ethane or its isomer. Unless otherwise specified, the bis(vinylphenyl) ethane used in the prepolymerization reaction has a monomer content of between 80% and 100%. In other words, the prepolymer of the present disclosure is prepared by subjecting the compound of Formula (I) and a bis(vinylphenyl) ethane containing 80% to 100% of the monomer.

For example, in one embodiment, the divinylbenzene may comprise any one or more isomers such as 1,4-divinylbenzene, 1,3-divinylbenzene, etc. Unless otherwise specified, according to the present disclosure, the divinylbenzene used in the prepolymerization reaction has a content of 1,4-divinyl group of between 80% and 99%.

For example, in one embodiment, the modification of divinylbenzene may comprise any modification derived from divinylbenzene (such as 1,4-divinylbenzene, 1,3-divinylbenzene or a combination thereof), including but not limited to a divinylbenzene copolymer, a divinylbenzene prepolymer, a divinylbenzene derivative or a combination thereof. Examples include but are not limited to a copolymer, a prepolymer or a derivative of divinylbenzene and a following component: methyl methacrylate resin, triallyl isocyanurate resin, triallyl cyanurate resin, ethylstyrene or a combination thereof.

For example, the divinylbenzene prepolymer is, such as but not limited to, a prepolymer of divinylbenzene and at least one another compound, such as but not limited to a prepolymer of divinylbenzene, methyl methacrylate resin and triallyl isocyanurate resin. For example, the divinylbenzene copolymer is, such as but not limited to, a copolymer of divinylbenzene and at least one another compound, such as but not limited to a copolymer of divinylbenzene and ethylstyrene, or a trimer of divinylbenzene, ethylstyrene and styrene.

Unless otherwise specified, according to the present disclosure, a prepolymer refers to a product with an intermediate molecular weight obtained by subjecting a monomer (e.g., the compound of Formula (I) and the vinyl-containing compound) to a certain degree of reaction, the intermediate molecular weight being greater than the molecular weight of the monomer before reaction but less than the molecular weight of the final polymer obtained from a complete reaction; in addition, the prepolymer contains a reactive functional group capable of participating further polymerization to obtain the final polymer product which has been fully crosslinked or cured. According to the present disclosure, prepolymerization reaction refers to the process of reacting one, two or more monomers to obtain a prepolymer. Monomer refers to a compound which may participate polymerization or prepolymerization reaction.

The prepolymerization reaction of the compound of Formula (I) and the vinyl-containing compound as used herein refers to a conversion rate of the compound of Formula (I) of greater than 0% and less than 100% (exclusive of 0% and 100%), such as but not limited to a conversion rate of between 10% and 90% (inclusive of 10% and 90%). Existence of some unreacted (e.g., not converted) vinyl-containing compounds may increase the compatibility and crosslinking degree of the prepolymer in the resin composition. Specifically, a 0% conversion rate of the vinyl-containing compound represents no reaction of the vinyl-containing compound and therefore no product formation from the prepolymerization reaction of the vinyl-containing compound and the compound of Formula (I). Similarly, a 100% conversion rate of the vinyl-containing compound represents complete reaction of the vinyl-containing compound and therefore no product formation from the prepolymerization reaction of the vinyl-containing compound and the compound of Formula (I).

Unless otherwise specified, according to the present disclosure, a compound refers to a chemical substance formed by two or more elements bonded with chemical bonds and may be present as a monomer, a polymer, etc., but not limited thereto. A polymer refers to a chemical substance formed by one, two or more compounds via polymerization and may comprise a homopolymer, a copolymer, etc., but not limited thereto. As used herein, the term "polymer" includes but is not limited to an oligomer. An oligomer refers to a polymer with 2-20, typically 2-5, repeating units.

Generally, a prepolymer refers to a chemical substance formed by one, two or more compounds via a prepolymerization reaction. As used herein, a prepolymer refers to a chemical substance formed by two or more compounds via a prepolymerization reaction.

In one embodiment, for example, the prepolymer disclosed herein is prepared by subjecting the compound of Formula (I) and a monomer or polymer of the vinyl-containing compound to a prepolymerization reaction in the presence of a reaction initiator.

In one embodiment, for example, relative to a total of 100 parts by weight of the compound of Formula (I) and the vinyl-containing compound, the content of the reaction initiator is 0.001 to 1 part by weight.

In one embodiment, for example, examples of the reaction initiator may include, but not limited to, a Grubbs catalyst, a metal chloride or a combination thereof.

In one embodiment, for example, the Grubbs catalyst may comprise a second-generation Grubbs catalyst, examples including but not limited to (1,3-bis-(2,4,6-trimethylphenyl)-2-imidazolidinylidene)dichloro(o-isopropoxyphenylmethylene)ruthenium, dichloro(o-isopropoxyphenylmethylene)(tricyclohexylphosphine) ruthenium(II) or a combination thereof.

In one embodiment, for example, the metal chloride may comprise aluminium chloride.

To enable the reactants, i.e., the compound of Formula (I) and the vinyl-containing compound, to undergo a pre-specified degree of the prepolymerization reaction to form the prepolymer with an intermediate molecular weight, the conversion rate of the prepolymerization reaction needs to be controlled in a range of greater than 0% and less than 100%, such as between 10% and 90% or between 30% and 80%, such as about 10%, 20%, 30%, 40%, 50%, 60%, 70%, 80% or 90%. Generally speaking, the following problems may appear if the conversion rate is too high: the reaction product will have high gelation tendency, which causes poor shelf life or difficulty of dissolution due to gelation during the prepolymerization process; the reaction product will have excessively high weight average molecular weight, which causes poor compatibility of the reaction product in the resin composition and poor flowability and poor appearance of articles made therefrom, such as prepregs; and insufficient amount of remaining compound of Formula (I) and vinyl-containing compound not participating the prepolymerization reaction, which leads to insufficient reactive functional groups in the resin composition useful for crosslinking and therefore the glass transition temperature of the articles is not high. On the other hand, if the conversion rate is too low, the crosslinking degree of the vinyl-containing compound and the compound of Formula (I) will be insufficient, which makes improvement in the glass transition temperature of the reaction product difficult.

In one embodiment, the prepolymer according to the present disclosure contains some residual reactive vinyl groups after the prepolymerization reaction of the reactants and therefore has the potential of crosslinking in a resin composition with other components.

One of the features of the present disclosure is to, under proper conditions, control the reaction conversion rate of the compound of Formula (I) and the vinyl-containing compound and the molecular weight of the prepolymer obtained therefrom. For example, during the prepolymerization reaction, the aforesaid reaction initiator is used to control the reaction conversion rate of the compound of Formula (I) and the vinyl-containing compound, such that the components are partially reacted and the product may retain residual vinyl groups (i.e., unreacted vinyl groups). For example, after the prepolymerization reaction, the conversion rate of the compound of Formula (I) may be between 10% and 90%, preferably between 30% and 80%. Specifically, a 0% conversion rate of the compound of Formula (I) represents no reaction of the compound of Formula (I) and therefore fails to form the prepolymer of the present disclosure. Similarly, a 100% conversion rate of the compound of Formula (I) represents complete reaction of the compound of Formula (I) and therefore fails to form the prepolymer of the present disclosure, and the product thus obtained from a 100% conversion rate will not contain a reactive vinyl group.

According to the present disclosure, a weight ratio of the compound of Formula (I) to the vinyl-containing compound in the prepolymerization reaction is from 8:2 to 6:4. Preferably, the weight ratio of the compound of Formula (I) and the vinyl-containing compound may be for example 8:2, 7.5:2.5, 7:3, 6.5:3.5 or 6:4, but not limited thereto. For example, in the prepolymerization reaction, the weight ratio of the compound of Formula (I) and the vinyl-containing compound is 8:2, 7:3 or 6:4.

In one embodiment, the temperature of the prepolymerization reaction used for making the prepolymer according to the present disclosure may range from 70 to 120° C., such as but not limited to 70° C., 72° C., 74° C., 75° C., 78° C., 80° C., 82° C., 85° C., 88° C., 90° C., 95° C., 100° C., 110° C. or 120° C., as well as any specific point value between the aforesaid values. For the purpose of brevity and conciseness, not all specific point values are described and listed exhaustively herein.

In one embodiment, the prepolymerization reaction disclosed herein has a reaction time of 1 to 8 hours, such as but not limited to 1 hour, 1.5 hours, 2 hours, 2.5 hours, 3 hours, 3.5 hours, 4 hours, 6 hours or 8 hours, as well as any specific point value between the aforesaid values. For the purpose of brevity and conciseness, not all specific point values are described and listed exhaustively herein.

In addition, also disclosed herein is a resin composition, comprising the above-described prepolymer and an additive.

In one embodiment, for example, the resin composition comprises 1 to 300 parts by weight of the additive relative to 100 parts by weight of the prepolymer. The type of the additive is not particularly limited, which may be any one or more compounds capable of being crosslinked with the prepolymer.

In one embodiment, for example, the additive may comprise polyphenylene ether resin, maleimide resin, vinyl-containing polyolefin resin, hydrogenated polyolefin resin, bis(vinylphenyl) ethane as described above, divinylbenzene as described above, modification of divinylbenzene as described above, triallyl isocyanurate, triallyl cyanurate, styrene copolymer or a combination thereof. In addition, unless otherwise specified, the additive of the present disclosure, such as polyphenylene ether resin, maleimide resin, vinyl-containing polyolefin resin, hydrogenated polyolefin resin, bis(vinylphenyl) ethane, divinylbenzene, modification of divinylbenzene, triallyl isocyanurate, triallyl cyanurate and styrene copolymer, shall be construed as including a modification thereof. Examples of the modification described above may comprise, but not limited to, a product derived from the additive with its reactive functional group modified, a product from a prepolymerization reaction of the additive and other compound(s), a product from a crosslinking reaction of the additive and other compound(s), a product from homopolymerizing the additive, a product from copolymerizing the additive and another different additive, etc.

In one embodiment, for example, relative to 100 parts by weight of the prepolymer, the content of each additive or a combination thereof may be 1 to 200 parts by weight, preferably 5 to 110 parts by weight, such as 5, 10, 15, 20, 30, 40, 50, 60, 70, 80, 90, 100 or 110 parts by weight, such as from 20 to 108 parts by weight.

Modifications of additives suitable for the resin composition of the present disclosure preferably refers to products derived from additives whose hydrogen atom or group is substituted by other atom or group. For example, halogen-substituted hydrocarbon, alcohol, aldehyde, and carboxylic acid may be considered as derivatives of hydrocarbon as they are products of hydrocarbon group with its hydrogen atom substituted by halogen, hydroxyl group, oxygen, etc.

Additives suitable for the resin composition disclosed herein are described briefly below.

Polyphenylene ether resin may comprise vinyl-containing polyphenylene ether resin, but not limited thereto. For example, unless otherwise specified, the polyphenylene ether resin used in the present disclosure is not particularly limited and may be any commercial product, synthesized product by the Applicant or a combination thereof. In some embodiments, examples of the polyphenylene ether resin include: vinylbenzyl-terminated polyphenylene ether resin (e.g., OPE-2st available from Mitsubishi Gas Chemical Co., Inc.), methacrylate-terminated polyphenylene ether resin (e.g., SA9000 available from SABIC), vinylbenzyl-modified bisphenol A polyphenylene ether resin, vinyl-containing chain-extended polyphenylene ether resin, dicyclopentadiene-containing methacrylate-terminated polyphenylene ether resin or a combination thereof. For example, the vinyl-containing chain-extended polyphenylene ether resin may include various polyphenylene ether resins disclosed in the US Patent Application Publication No. 2016/0185904 A1, all of which are incorporated herein by reference in their entirety. For example, the vinyl-containing chain-extended polyphenylene ether resin may comprise a chain-extended methacrylate-terminated polyphenylene ether resin or a chain-extended vinyl-terminated polyphenylene ether resin.

In some embodiments, the amount of the polyphenylene ether resin, relative to 100 parts by weight of the prepolymer, may be 5-120 parts by weight, preferably 10-100 parts by weight, and more preferably 20-100 parts by weight.

The maleimide resin may be a compound or a mixture and may contain a monomer, a polymer or a combination thereof which comprises at least one maleimide group. Unless otherwise specified, the maleimide resin used in the present disclosure is not particularly limited and may include any one or more maleimide resins or a combination thereof used for preparing a resin film, a prepreg, a laminate or a printed circuit board. Examples include but are not limited to 4,4'-diphenylmethane bismaleimide, oligomer of phenylmethane maleimide (a.k.a. polyphenylmethane maleimide), m-phenylene bismaleimide, bisphenol A diphenyl ether bismaleimide, 3,3'-dimethyl-5,5'-diethyl-4,4'- diphenylmethane bismaleimide, 4-methyl-1,3-phenylene bismaleimide, 1,6-bismaleimide-(2,2,4-trimethyl hexane), N-2,3-xylyl maleimide, N-2,6-xylylmaleimide, N-phenylmaleimide, maleimide resin containing aliphatic long chain structure, prepolymer thereof and a combination thereof. The prepolymer of maleimide resin may for example be a prepolymer of diallyl compound and maleimide resin, a prepolymer of diamine and maleimide resin, a prepolymer of multi-functional amine and maleimide resin or a prepolymer of acid phenol compound and maleimide resin, but not limited thereto.

For example, the maleimide resin may include products such as BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 and BMI-7000H available from Daiwakasei Co., Ltd., or products such as BMI-70 and BMI-80 available from K.I Chemical Industry Co., Ltd.

For example, the maleimide resin containing aliphatic long-chain structure may include products such as BMI-689, BMI-1400, BMI-1500, BMI-1700, BMI-2500, BMI-3000, BMI-5000 and BMI-6000 available from Designer Molecules Inc.

In some embodiments, the amount of the maleimide resin, relative to 100 parts by weight of the prepolymer, may be 5-100 parts by weight, preferably 5-50 parts by weight, and more preferably 20-45 parts by weight.

For example, in one embodiment, the vinyl-containing polyolefin resin disclosed herein may include, but not limited to, styrene-butadiene-divinylbenzene terpolymer, styrene-butadiene-maleic anhydride terpolymer, vinyl-polybutadiene-urethane oligomer, styrene-butadiene copolymer (such as but not limited to styrene-butadiene-styrene copolymer), styrene-isoprene copolymer, maleic anhydride-butadiene copolymer, polybutadiene (i.e., homopolymer of butadiene), or a combination thereof. In some embodiments, the amount of the vinyl-containing polyolefin resin, relative to 100 parts by weight of the prepolymer, may be 5-50 parts by weight, preferably 5-40 parts by weight, and more preferably 5-25 parts by weight.

For example, in one embodiment, the hydrogenated polyolefin resin disclosed herein may comprise any one or more commercially available products, self-prepared products, or a combination thereof. Examples include but are not limited to hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof. In some embodiments, the amount of the hydrogenated polyolefin resin, relative to 100 parts by weight of the prepolymer, may be 1-10 parts by weight, preferably 3-5 parts by weight.

In one embodiment, for example, the resin composition disclosed above may further optionally comprise flame retardant, inorganic filler, curing accelerator, solvent, polymerization inhibitor, toughening agent, coupling agent or a combination thereof. Unless otherwise specified, relative to a total of 100 parts by weight of the prepolymer and the additive, the content of the aforesaid component may be 1 to 300 parts by weight, such as 5, 10, 20, 30, 40, 50, 60, 70, 80, 90, 100, 150, 200, 250 or 300 parts by weight, such as 30-150 parts by weight or 200-300 parts by weight.

The flame retardant disclosed above may be any one or more flame retardants used for preparing a resin film, a prepreg, a laminate or a printed circuit board; examples include but are not limited to phosphorus-containing flame retardant, preferably including ammonium polyphosphate, hydroquinone bis(diphenyl phosphate), bisphenol A bis(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, 9,10-dihydro-9-oxa-10-phosphaphenanthrene-10-oxide (DOPO) and its derivatives or resins, diphenylphosphine oxide (DPPO) and its derivatives or resins, melamine cyanurate, tris(2-hydroxyethyl) isocyanurate, aluminium phosphinate (e.g., commercially available OP-930 and OP-935), or a combination thereof For example, the flame retardant may be a DPPO compound (e.g., di-DPPO compound), a DOPO compound (e.g., di-DOPO compound), a DOPO resin (e.g., DOPO-HQ, DOPO-NQ, DOPO-PN, and DOPO-BPN), and a DOPO-containing epoxy resin, wherein DOPO-PN is a DOPO-containing phenol novolac resin, and DOPO-BPN may be a DOPO-containing bisphenol novolac resin, such as DOPO-BPAN (DOPO-bisphenol A novolac), DOPO-BPFN (DOPO-bisphenol F novolac) and DOPO-BPSN (DOPO-bisphenol S novolac).

For example, relative to a total of 100 parts by weight of the prepolymer and the additive, the amount of flame retardant used in the present disclosure is not particularly limited, and may range from 1 to 100 parts by weight, such as 10 to 90 parts by weight, 20 to 80 parts by weight, 30 to 70 parts by weight, or 40 to 60 parts by weight.

The inorganic filler may be any one or more inorganic fillers used for preparing a resin film, a prepreg, a laminate or a printed circuit board; examples of inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride, calcined kaolin, hollow porous particle or a combination thereof. Moreover, the inorganic filler can be spherical, fibrous, plate-like, particulate, sheet-like, whisker-like or a combination thereof in shape and can be optionally pretreated by a silane coupling agent. In some embodiments, the present disclosure uses the spherical silica SC-2050 SVJ available from Admatechs.

For example, relative to a total of 100 parts by weight of the prepolymer and the additive, the amount of inorganic filler used in the present disclosure is not particularly limited, and may range from 10 to 300 parts by weight, such as 10 to 200 parts by weight or 20 to 150 parts by weight.

The curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate.

The curing accelerator may also encompass curing initiator such as a peroxide capable of producing free radicals, and examples of the curing initiator may comprise but not limited to: benzoyl peroxide, dicumyl peroxide, 2,5-dimethyl-2,5-di(t-butylperoxy)hexane, 2,5 -dimethyl-2,5 - di (t-butylperoxy)-3 -hexyne, di-t-butyl peroxide, di(t-butylperoxyisopropyl)benzene, di(t-butylperoxy)phthalate, di(t-butylperoxy)isophthalate, t-butyl peroxybenzoate, 2,2-di(t-butylperoxy)butane, 2,2-di(t-butylperoxy)octane, 2,5-dimethyl-2,5-di(benzoylperoxy)hexane, lauroyl peroxide, t-hexyl peroxypivalate, dibutylperoxyisopropylbenzene, bis (4-t-butylcyclohexyl) peroxydicarbonate or a combination thereof. For example, relative to a total of 100 parts by weight of the prepolymer and the additive, the amount of curing accelerator used in the present disclosure may range from 0.01 to 5 parts by weight, preferably 1 to 2 parts by weight.

The purpose of adding solvent is to change the solid content of the resin composition and to adjust the viscosity of the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxy ethyl acetate, propoxyethyl acetate, ethyl acetate, dimethylformamide, dimethylacetamide, propylene glycol methyl ether, or a mixture thereof. For example, relative to a total of 100 parts by weight of the prepolymer and the additive, the amount of solvent used in the present disclosure may range from 10 to 200 parts by weight, preferably 50 to 150 parts by weight.

In one embodiment, for example, the resin composition according to the present disclosure may be added with a solvent to form a varnish, which preferably has a shelf life of greater than or equal to one month.

The polymerization inhibitor may include any one or more polymerization inhibitors used for preparing a resin film, a prepreg, a laminate or a printed circuit board. For example, relative to a total of 100 parts by weight of the prepolymer and the additive, the amount of polymerization inhibitor used in the present disclosure may range from 0.0005 to 0.01 part by weight, such as 0.0005 to 0.001 part by weight.

The purpose of adding toughening agent is to improve the toughness of the resin composition. The toughening agent may comprise, but not limited to, rubber resin, carboxyl-terminated butadiene acrylonitrile rubber (CTBN rubber), core-shell rubber, or a combination thereof. For example, relative to a total of 100 parts by weight of the prepolymer and the additive, the amount of toughening agent used in the present disclosure may range from 1 to 20 parts by weight, preferably 3 to 10 parts by weight.

The coupling agent may include, but not limited to, a silane coupling agent, which may comprise any silane (such as but not limited to siloxane) or a combination thereof and may be further categorized according to the functional groups into amino silane, epoxide silane, vinyl silane, acrylate silane, methacrylate silane, hydroxyl silane, isocyanate silane, methacryloxy silane and acryloxy silane. For example, relative to a total of 100 parts by weight of the prepolymer and the additive, the amount of coupling agent used in the present disclosure may range from 0.001 to 3 parts by weight, preferably 0.01 to 1 part by weight.

The resin composition according to the present disclosure may be used to make various articles. For example, the article made from the resin composition disclosed herein may comprise a resin film, a prepreg, a laminate or a printed circuit board.

The article made from the resin composition may be a resin film which is prepared by heating and baking the resin composition to the semi-cured state (B-stage). The resin composition may be selectively coated on a polyethylene terephthalate film (PET film), a polyimide film (PI film), or a liquid crystal resin film, followed by heating and baking to semi-cure the resin composition to convert the resin composition into a resin film. The resin composition may also be coated on a copper foil, followed by baking and heating to the semi-cured state to obtain a resin-coated copper (RCC), also known as a resin film with copper foil.

The article made from the resin composition may be a prepreg, which comprises a reinforcement material and a layered structure disposed thereon. The layered structure is formed by heating the resin composition at a high temperature to the B-stage. Suitable baking temperature for making a prepreg may be for example 130° C. to 170° C., preferably 140° C. to 160° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric used for various printed circuit boards, such as E-glass fabric, D-glass fabric, S-glass fabric, T-glass fabric, L-glass fabric or Q-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal resin woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

The resin composition can be used to make a laminate, which comprises two metal foils and an insulation layer disposed between the metal foils, wherein the insulation layer is formed by curing the prepreg or resin film at high temperature and high pressure to the C-stage, a suitable curing temperature being for example between 190° C. and 230° C. and preferably between 200° C. and 220° C. and a suitable curing time being 60 to 200 minutes and preferably 60 to 180 minutes. The metal foil may comprise copper, aluminum, nickel, platinum, silver, gold or alloy thereof, such as a copper foil.

Preferably, the laminate is a copper-clad laminate (CCL).

The laminate may be further processed by trace formation processes to provide a printed circuit board.

In one or more embodiments, the articles made from the resin composition disclosed herein may have at least one, preferably at least two, more or all, of the following properties:

a dissipation factor as measured by reference to JIS C2565 at 10 GHz of less than or equal to 0.0015, such as between 0.0012 and 0.0015;

a glass transition temperature as measured by using a dynamic mechanical analyzer by reference to IPC-TM-650 2.4.24.4 of greater than or equal to 200° C., such as greater than or equal to 205° C. or greater than or equal to 210° C., such as between 205° C. and 220° C.;

a Z-axis coefficient of thermal expansion as measured by using a thermomechanical analyzer by reference to IPC-TM-650 2.4.24.5 of less than or equal to 50 ppm/° C., such as between 30 ppm/° C. and 50 ppm/° C. or between 35 ppm/° C. and 49 ppm/° C.;

a T288 thermal resistance as measured by reference to IPC-TM-650 2.4.24.1 of greater than 120 minutes, such as no delamination between 120 minutes and 150 minutes or no delamination between 120 minutes and 130 minutes; and a copper foil peeling strength as measured by reference to IPC-TM-650 2.4.8 of greater than or equal to 3.0 lb/in, such as between 3.01 lb/in and 3.61 lb/in or between 3.28 lb/in and 3.61 lb/in.

Methods for measuring the aforesaid properties will be elaborated in detail below.

Raw materials below were used to prepare the resin compositions of various Examples and Comparative Examples of the present disclosure according to the amount listed in Table 1 to Table 4 and further fabricated to prepare test samples.

Materials and reagents used in Examples and Comparative Examples disclosed herein are listed below:

Prepolymer 1: Compound A obtained from Synthesis Example 1.

Prepolymer 2: Compound B obtained from Synthesis Example 2.

Prepolymer 3: Compound C obtained from Synthesis Example 3.

Prepolymer 4: Compound D obtained from Synthesis Example 4.

Prepolymer 5: Compound E obtained from Synthesis Example 5.

Prepolymer 6: Compound F obtained from Synthesis Example 6.

Copolymer 1: PROXIMA® resin, a copolymer of dicyclopentadiene and norbornene, as shown by Formula (I), wherein m and n are individually an integer of 1 to 10, available from Materia Inc.

Bis(vinylphenyl) ethane: 1,2-bis(4-vinylphenyl) ethane, having a monomer content of 90% and a content of para-para vinyl groups of 90%, available from Linchuan Chemical Co., Ltd.

Modification of divinylbenzene: prepared according to Synthesis Example 7.

Divinylbenzene: available from Merck.

Vinyl-containing polyolefin resin 1: Ricon 100, styrene-butadiene copolymer, available from Cray Valley.

Vinyl-containing polyolefin resin 2: B-1000, polybutadiene, available from Nippon Soda Co., Ltd.

Vinyl-containing polyolefin resin 3: Ricon 257, styrene-butadiene-divinylbenzene terpolymer, available from Cray Valley.

Hydrogenated polyolefin resin: H1052, hydrogenated styrene-butadiene copolymer, available from Asahi-Kasei Corporation.

Maleimide resin 1: BMI-TMH, available from Daiwakasei Industry Co., Ltd.

Maleimide resin 2: BMI-3000, available from Designer Molecules Inc.

Polyphenylene ether resin 1: DCPD-PPE, dicyclopentadiene-containing methacrylate-terminated polyphenylene ether resin, available from Jdro Technology Co., Ltd.

Polyphenylene ether resin 2: OPE-2st 2200, vinylbenzyl-terminated polyphenylene ether resin, available from Mitsubishi Gas Chemical Co., Inc.

Triallyl isocyanurate: TAIC, available from Kingyorker Enterprise Co., Ltd.

Styrene copolymer: 5G-001S, available from Novoset LLC.

Curing accelerator: 25B, 2,5-dimethyl-2,5-di(t-butylperoxy)-3-hexyne, available from NOF Corporation.

Boron nitride: CFP007ST, sheet-like boron nitride, available from 3M.

Hollow porous particle: MBP-8, available from Sekisui Kasei Co., Ltd.

Spherical silica: SC-2050 SVJ, available from Admatechs.

Toluene: commercially available.

SYNTHESIS EXAMPLES (FOR EACH SNYTHESIS EXAMPLE, THE SOLID CONTENT OF EACH COMPONENT IS 100%)

Synthesis Example 1

To a three-necked flask, 80 parts by weight of a copolymer of dicyclopentadiene and norbornene (PROXIMA® resin) and 20 parts by weight of bis(vinylphenyl) ethane (in each Synthesis Example, the bis(vinylphenyl) ethane used refers to 1,2-bis(4-vinylphenyl) ethane, having a monomer content of 90% and a content of para-para vinyl groups of 90%) were added, followed by adding 150 parts by weight of toluene and continuously stirring to fully dissolve the solid raw materials to obtain a mixture solution. After that, 0.005 part by weight of (1,3-bis-(2,4,6-trimethylphenyl)-2-imidazolidinylidene)dichloro(o-isopropoxyphenylmethylene)ruthenium available from MERCK was added to the mixture solution, and the mixture solution was heated from room temperature to 90° C. and stirred for 3 hours and then cooled to room temperature. After purification to remove some solvent and impurities, a prepolymer solution having a solid content of about 60% was obtained, and the substance other than solvent in the solution was Compound A, which is the Prepolymer 1 according to the present disclosure.

The Prepolymer 1 (i.e., solid product obtained after removing solvent from the prepolymer solution) was analyzed by Fourier-transform infrared spectroscopy (FTIR). The sole FIGURE is the FTIR spectrum of the Prepolymer 1, wherein the peak at 913.07cm$^{-1}$ represents the characteristic peak of vinyl group, indicating that the Prepolymer 1 thus obtained contains a reactive vinyl group. Therefore, during the synthesis of the Prepolymer 1, the compound of Formula (I) has a conversion rate of greater than 0% and less than 100% (exclusive of 0% and 100%), such as a conversion rate of between 10% and 90%, and the conversion rate is not equal to 100% because a 100% conversion rate will not leave any residual reactive vinyl group.

Synthesis Example 2

Substantially the same as Synthesis Example 1, except that 60 parts by weight of a copolymer of dicyclopentadiene and norbornene (PROXIMA® resin) and 40 parts by weight of bis(vinylphenyl) ethane were used. Compound B obtained from Synthesis Example 2 is the Prepolymer 2 according to the present disclosure.

Synthesis Example 3

Substantially the same as Synthesis Example 1, except that 80 parts by weight of a copolymer of dicyclopentadiene and norbornene (PROXIMA® resin) and 20 parts by weight of a modification of divinylbenzene (prepared from Synthesis Example 7 below) were used. Compound C obtained from Synthesis Example 3 is the Prepolymer 3 according to the present disclosure.

Synthesis Example 4

Substantially the same as Synthesis Example 2, except that 60 parts by weight of a copolymer of dicyclopentadiene and norbornene (PROXIMA® resin) and 40 parts by weight of a modification of divinylbenzene (prepared from Synthesis Example 7 below) were used. Compound D obtained from Synthesis Example 4 is the Prepolymer 4 according to the present disclosure.

Synthesis Example 5

Substantially the same as Synthesis Example 1, except that 80 parts by weight of a copolymer of dicyclopentadiene and norbornene (PROXIMA® resin) and 20 parts by weight of divinylbenzene were used. Compound E obtained from Synthesis Example 5 is the Prepolymer 5 according to the present disclosure.

Synthesis Example 6

Substantially the same as Synthesis Example 1, except that 0.005 part by weight of (1,3-bi s -(2,4,6-trimethylphenyl)-2-imidazolidinydene)dichloro(o-isopropoxyphenylmethylene)ruthenium was replaced by 0.01 part by weight of aluminium chloride. Compound F obtained from Synthesis Example 6 is the Prepolymer 6 according to the present disclosure.

Synthesis Example 7

To 100 parts by weight of a toluene solvent in a three-necked flask, 60 parts by weight of 1,4-divinylbenzene compound and 40 parts by weight of 4-ethylstyrene were added, followed by adding 2 parts by weight of tetrabutylammonium and 1 part by weight of stannic chloride, and the reaction was performed under stirring at 100° C. for 3 hours. After the reaction was completed, the product was filtered, purified and precipitated with methanol and cooled to obtain the modification of divinylbenzene in solid state, which was a divinylbenzene copolymer.

Resin composition of Example E1 was formulated, wherein the content in part by weight of each component in the Examples and Comparative Examples represents its solid content which does not contain solvent.

100 parts by weight of the Prepolymer 1 and 120 parts by weight of toluene were well mixed and stirred to the liquid state. Then 1 part by weight of 25B was added and stirred for 0.5 hour, followed by adding 100 parts by weight of SC-2050 SVJ and stirring for 2 hours, so as to obtain the resin composition of Example E1.

According to the ingredients and amounts listed in Table 1 to Table 4 below and by reference to the preparation of the resin composition of Example El described above, resin compositions of Examples E2 to E11 containing the prepolymer of the present disclosure and Comparative Examples C1 to C10 were prepared.

Resin compositions from different Examples (E1 to E11) and Comparative Examples (C1 to C10) were respectively added to a stirred tank, well mixed and fully dissolved as varnishes and then loaded to an impregnation tank. A fiberglass fabric (e.g., 2116 or 1080 L-glass fiber fabric) was immersed into the impregnation tank to adhere the resin composition on the fiberglass fabric, followed by heating at 140° C. to 160° C. to the semi-cured state (B-Stage) to obtain the prepreg.

Samples were prepared according to the descriptions below and tested by reference to the following conditions.

1. Copper-clad laminate (obtained by laminating six prepregs)

Two 18 μm hyper very low profile (HVLP) copper foils and six prepregs made from each resin composition (using 2116 L-glass fiber fabrics) were prepared. Each prepreg has a resin content of about 55%. A copper foil, six prepregs and a copper foil were superimposed in such order and then subject to a vacuum condition for lamination at 220° C. for 2 hours to form each copper-clad laminate sample. Insulation layers were formed by curing (C-stage) six sheets of superimposed prepreg between the two copper foils, and the resin content of the insulation layers is about 55%.

2. Copper-free laminate (obtained by laminating six prepregs)

Each copper-clad laminate was etched to remove the copper foils on both sides to obtain a copper-free laminate made from laminating six prepregs and having a resin content of about 55%.

3. Copper-free laminate (obtained by laminating two prepregs)

Two 18 μm hyper very low profile (HVLP) copper foils and two prepregs made from each resin composition (using 1080 L-glass fiber fabrics) were prepared. Each prepreg has a resin content of about 70%. A copper foil, two prepregs and a copper foil were superimposed in such order and then subject to a vacuum condition for lamination at 220° C. for 2 hours to form each copper-clad laminate sample. Next, each copper-clad laminate was etched to remove the copper foils on both sides to obtain a copper-free laminate made from laminating two prepregs and having a resin content of about 70%.

Test items and test methods are described below.

1. Dissipation Factor (Df)

The aforesaid copper-free laminate (obtained by laminating two prepregs) was subject to dissipation factor measurement. Each specimen was measured by using a microwave dielectrometer (available from AET Corp.) by reference to JIS C2565 at room temperature (about 25° C.) and under 10 GHz frequency. Lower dissipation factor represents better dielectric properties of the sample. Under a 10 GHz frequency, for a Df value of less than 0.0030, a difference in Df of less than 0.0001 represents no substantial difference in dissipation factor in different laminates, and a difference in Df value of greater than or equal to 0.0001 represents a significant difference (i.e., significant technical difficulty) in dissipation factor in different laminates.

2. Glass Transition Temperature (Tg)

A copper-free laminate sample (obtained by laminating six prepregs) was subject to the glass transition temperature measurement. The glass transition temperature (DMA Tg, in ° C.) of each specimen was measured by using a dynamic mechanical analyzer (DMA) by reference to IPC-TM-650 2.4.24.4. Temperature interval during the measurement was set at 50-300° C. with a temperature increase rate of 2° C./minute. In the present technical field, higher glass transition temperature is better.

3. Coefficient of Thermal Expansion in Z-Axis (Z-CTE)

The copper-free laminate (obtained by laminating six prepregs) sample was tested by a thermal mechanical analyzer (TMA) during the measurement of Z-axis coefficient of thermal expansion (Z-CTE), during which each sample was heated from 35° C. to 300° C. at a heating rate of 10° C./minute and then subject to the measurement of the Z-axis coefficient of thermal expansion (in ppm/° C.) in a temperature range of 50° C. to 110° C. by reference to IPC-TM-650 2.4.24.5. Lower Z-axis coefficient of thermal expansion represents a better dimensional expansion property. A difference in the Z-axis coefficient of thermal expansion of greater than or equal to 1 ppm/° C. represents a substantial difference. For example, articles made from the resin composition disclosed herein have a Z-axis coefficient of thermal expansion as measured by reference to IPC-TM-650 2.4.24.5 of less than or equal to 50 ppm/° C., such as between 30 ppm/° C. and 50 ppm/° C. or between 35 ppm/° C. and 49 ppm/° C.

4. Varnish Precipitation Property (i.e., Varnish Shelf Life)

A varnish was prepared from the resin composition of each Example or Comparative Example according to Table 1 to Table 4 without adding spherical silica; the varnish was well mixed and fully dissolved and stood still at 25° C. for one month (30 days) and observed by naked eyes on the 30th day to determine whether or not the varnish precipitates to form brown solid substance. A designation of "N" represents no precipitation occurred, indicating a shelf life of the varnish of greater than or equal to one month, such as a shelf life of one to one-and-a-half months, such as a shelf life of one month to one month and a week. The presence of at least one precipitate of 0.5-5 mm in length, usually in brown color, is designated as "P". Precipitation of the varnish will cause variation in properties of laminates made therefrom.

5. T288 Thermal Resistance

A copper-clad laminate sample (obtained by laminating six prepregs, 6.5 mm*6.5 mm in size) was used in the T288 thermal resistance test. At a constant temperature of 288° C., a thermal mechanical analyzer (TMA) was used by reference to IPC-TM-650 2.4.24.1 to test each sample and record the time to delamination (e.g., blistering) of the copper-clad laminate. Longer time to delamination represents better thermal resistance of the copper-clad laminate made from the resin composition. If no delamination was observed after 120 minutes in the test, a designation of ">120" was given, indicating no delamination after more than 120 minutes in the T288 thermal resistance test.

For example, articles made from the resin composition disclosed herein are characterized by a time to delamination as measured by using a thermal mechanical analyzer by reference to IPC-TM-650 2.4.24.1 of greater than or equal to 120 minutes, such as between 120 minutes and 150 minutes, such as between 120 minutes and 130 minutes.

6. Copper Foil Peeling Strength (Peeling Strength, P/S)

The copper-clad laminate sample (obtained by laminating six prepregs) was cut into a rectangular sample with a width of 24 mm and a length of greater than 60 mm, which was etched to remove surface copper foil to leave a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer of the laminate. In the present technical field, under a 10 GHz frequency, for a copper-clad laminate with a dissipation factor of less than 0.0030, a difference in copper foil peeling strength of greater than 0.1 lb/in represents a significant difference.

Resin compositions of different Examples and Comparative Examples are listed in Table 1 to Table 4, wherein the numerical value used therein represents solid content. For example, in Example E1, 100 parts by weight of the Prepolymer 1 represents the amount of the Prepolymer 1 in solid state not containing solvent is 100 parts by weight (100 weight units).

TABLE 1

Resin compositions (in part by weight) and test results

| Component | Name | E1 | E2 | E3 | E4 | E5 | E6 |
|---|---|---|---|---|---|---|---|
| Prepolymer 1 | Compound A | 100 | | 70 | | 70 | |
| Prepolymer 2 | Compound B | | 100 | 30 | | | |
| Prepolymer 3 | Compound C | | | | 50 | 20 | |
| Prepolymer 4 | Compound D | | | | 50 | | |
| Prepolymer 5 | Compound E | | | | | 10 | |
| Prepolymer 6 | Compound F | | | | | | 100 |
| Copolymer 1 | PROXIMA | | | | | | |
| | bis(vinylphenyl) ethane | | | | | | |
| | modification of divinylbenzene | | | | | | |
| | divinylbenzene | | | | | | |
| vinyl-containing polyolefin resin | Ricon 100 | | | | | | |
| | B-1000 | | | | | | |
| | Ricon 257 | | | | | | |
| hydrogenated polyolefin resin | H1052 | | | | | | |
| maleimide resin | BMI-TMH | | | | | | |
| | BMI-3000 | | | | | | |
| polyphenylene ether resin | DCPD-PPE | | | | | | |
| | OPE-2st 2200 | | | | | | |
| triallyl isocyanurate | TAIC | | | | | | |
| styrene copolymer | 5G-001S | | | | | | |
| curing accelerator | 25B | 1 | 1 | 1 | 1 | 1 | 1 |
| boron nitride | CFP007ST | | | | | | |
| hollow porous particle | MBP-8 | | | | | | |
| spherical silica | SC-2050 SVJ | 100 | 100 | 100 | 100 | 100 | 100 |
| solvent | toluene | 120 | 120 | 120 | 120 | 120 | 120 |

| Property | Unit | E1 | E2 | E3 | E4 | E5 | E6 |
|---|---|---|---|---|---|---|---|
| dissipation factor | none | 0.0013 | 0.0013 | 0.0013 | 0.0014 | 0.0015 | 0.0013 |
| glass transition temperature | ° C. | 205 | 207 | 206 | 205 | 205 | 215 |
| Z-axis coefficient of thermal expansion | ppm/° C. | 41 | 35 | 39 | 48 | 49 | 40 |
| precipitation property | none | N | N | N | N | N | P |

TABLE 2

Resin compositions (in part by weight) and test results

| Component | Name | C1 | C2 | C3 | C4 |
|---|---|---|---|---|---|
| Prepolymer 1 | Compound A | | | | |
| Prepolymer 2 | Compound B | | | | |
| Prepolymer 3 | Compound C | | | | |
| Prepolymer 4 | Compound D | | | | |
| Prepolymer 5 | Compound E | | | | |
| Prepolymer 6 | Compound F | | | | |
| Copolymer 1 | PROXIMA | 100 | 80 | 80 | 60 |
| | bis(vinylphenyl) ethane | | 20 | | |
| | modification of divinylbenzene | | | 20 | |
| | divinylbenzene | | | | 40 |

TABLE 2-continued

Resin compositions (in part by weight) and test results

| | | | | | |
|---|---|---|---|---|---|
| vinyl-containing polyolefin resin | Ricon 100 B-1000 | | | | |
| | Ricon 257 | | | | |
| hydrogenated polyolefin resin | H1052 | | | | |
| maleimide resin | BMI-TMH | | | | |
| | BMI-3000 | | | | |
| polyphenylene ether resin | DCPD-PPE | | | | |
| | OPE-2st 2200 | | | | |
| triallyl isocyanurate | TAIC | | | | |
| styrene copolymer | 5G-001S | | | | |
| curing accelerator | 25B | 1 | 1 | 1 | 1 |
| boron nitride | CFP007ST | | | | |
| hollow porous particle | MBP-8 | | | | |
| spherical silica | SC-2050 SVJ | 100 | 100 | 100 | 100 |
| solvent | toluene | 120 | 120 | 120 | 120 |

| Property | Unit | C1 | C2 | C3 | C4 |
|---|---|---|---|---|---|
| dissipation factor | none | 0.0012 | 0.0015 | 0.0014 | 0.0016 |
| glass transition temperature | °C. | 145 | 208 | 178 | 186 |
| Z-axis coefficient of thermal expansion | ppm/°C. | 70 | 55 | 65 | 61 |
| precipitation property | none | N | P | N | N |

TABLE 3

Resin compositions (in part by weight) and test results

| Component | Name | E1 | E7 | E8 | E9 | E10 | E11 |
|---|---|---|---|---|---|---|---|
| Prepolymer 1 | Compound A | 100 | 100 | 70 | 70 | 100 | 60 |
| Prepolymer 2 | Compound B | | | 30 | 30 | | 20 |
| Prepolymer 3 | Compound C | | | | | | 15 |
| Prepolymer 4 | Compound D | | | | | | 5 |
| Prepolymer 5 | Compound E | | | | | | |
| Prepolymer 6 | Compound F | | | | | | |
| Copolymer 1 | PROXIMA | | | | | | |
| bis(vinylphenyl) ethane | | | | 3 | | | 5 |
| modification of divinylbenzene | | | | 2 | | | |
| divinylbenzene | | | | | | | |
| vinyl-containing polyolefin resin | Ricon 100 | | 15 | 5 | | 5 | 5 |
| | B-1000 | | | | 10 | | |
| | Ricon 257 | | 10 | 5 | | | 3 |
| hydrogenated polyolefin resin | H1052 | | | 5 | | 3 | 3 |
| maleimide resin | BMI-TMH | | | | 30 | | 10 |
| | BMI-3000 | | | | 15 | | 10 |
| polyphenylene ether resin | DCPD-PPE | | | | | 50 | 15 |
| | OPE-2st 2200 | | | | | 50 | 5 |
| triallyl isocyanmate | TAIC | | | | | | 5 |
| styrene copolymer | 5G-001S | | | | | | 3 |
| curing accelerator | 25B | 1 | 1 | 1 | 1 | 1 | 2 |
| boron nitride | CFP007ST | | 10 | 10 | 10 | 10 | 15 |
| hollow porous particle | MBP-8 | | 5 | 5 | 5 | 5 | 8 |
| spherical silica | SC-2050 SVJ | 100 | 100 | 100 | 100 | 100 | 140 |
| solvent | toluene | 120 | 120 | 120 | 120 | 120 | 130 |

| Property | Unit | E1 | E7 | E8 | E9 | E10 | E11 |
|---|---|---|---|---|---|---|---|
| dissipation factor | none | 0.0013 | 0.0012 | 0.0013 | 0.0014 | 0.0015 | 0.0014 |
| glass transition temperature | °C. | 205 | 205 | 208 | 210 | 220 | 217 |
| Z-axis coefficient of thermal expansion | ppm/°C. | 41 | 41 | 45 | 40 | 39 | 36 |
| T288 thermal resistance | minute | >120 | >120 | >120 | >120 | >120 | >120 |
| copper foil peeling strength | lb/in | 3.01 | 3.43 | 3.35 | 3.52 | 3.61 | 3.28 |

TABLE 4

Resin compositions (in part by weight) and test results

| Component | Name | C5 | C6 | C7 | C8 | C9 | C10 |
|---|---|---|---|---|---|---|---|
| Prepolymer 1 | Compound A | | | | | | |
| Prepolymer 2 | Compound B | | | | | | |
| Prepolymer 3 | Compound C | | | | | | |
| Prepolymer 4 | Compound D | | | | | | |
| Prepolymer 5 | Compound E | | | | | | |
| Prepolymer 6 | Compound F | | | | | | |
| Copolymer 1 | PROXIMA | 100 | 80 | 80 | 80 | 60 | |
| bis(vinylphenyl) ethane | | | | 20 | | | |
| modification of divinylbenzene | | | | | 20 | | |
| divinylbenzene | | | | | | 40 | |
| vinyl-containing polyolefin resin | Ricon 100 B-1000 | 15 | 15 | 15 | 15 | 15 | 15 |
| | Ricon 257 | 10 | 10 | 10 | 10 | 10 | 10 |
| hydrogenated polyolefin resin | H1052 | | | | | | |
| maleimide resin | BMI-TMH | | | | | | |
| | BMI-3000 | | | | | | |
| polyphenylene ether resin | DCPD-PPE | | | | | | |
| | OPE-2st 2200 | | | | | | 100 |
| triallyl isocyanurate | TAIC | | | | | | |
| styrene copolymer | 5G-001S | | | | | | |
| curing accelerator | 25B | 1 | 1 | 1 | 1 | 1 | 1 |
| boron nitride | CFP007ST | 10 | 10 | 10 | 10 | 10 | 10 |
| hollow porous particle | MBP-8 | 5 | 5 | 5 | 5 | 5 | 5 |
| spherical silica | SC-2050 SVJ | 100 | 100 | 100 | 100 | 100 | 100 |
| solvent | toluene | 120 | 120 | 120 | 120 | 120 | 120 |

| Property | Unit | C5 | C6 | C7 | C8 | C9 | C10 |
|---|---|---|---|---|---|---|---|
| dissipation factor | none | 0.0013 | 0.0014 | 0.0015 | 0.0014 | 0.0016 | 0.0025 |
| glass transition temperature | °C. | 158 | 150 | 198 | 190 | 195 | 198 |
| Z-axis coefficient of thermal expansion | ppm/°C. | 70 | 77 | 56 | 68 | 65 | 62 |
| T288 thermal resistance | minute | 30 | 30 | 90 | 50 | 55 | >120 |
| copper foil peeling strength | lb/in | 2.78 | 2.65 | 3.00 | 2.89 | 2.67 | 3.41 |

The following observations can be made from Table 1 to Table 4.

By comparing Examples E1 to E2 and Comparative Example C1, it can be observed that through the prepolymerization of the compound of Formula (I) and the vinyl-containing compound (e.g., Examples E1 to E2), in contrast to the use of the compound of Formula (I) (e.g., Comparative Example C1), Examples E1 to E2 demonstrate great improvement in glass transition temperature and great decrease in coefficient of thermal expansion.

By comparing Examples E1 to E2 and Comparative Examples C2 to C4, it can be observed that through the prepolymerization of the compound of Formula (I) and the vinyl-containing compound (e.g., Examples E1 to E2), in contrast to the addition of the compound of Formula (I) and the vinyl-containing compound without prepolymerization (e.g., Comparative Examples C2 to C4), Examples E1 to E2 can achieve higher glass transition temperature and lower coefficient of thermal expansion at the same time.

By comparing Example E7 and Comparative Examples C5 to C9, it can be observed that through the prepolymerization of the compound of Formula (I) and the vinyl-containing compound (e.g., Example E7), in contrast to the use of the compound of Formula (I) (e.g., Comparative Examples C5 to C6) or the addition of the compound of Formula (I) and the vinyl-containing compound without prepolymerization (e.g., Comparative Examples C7 to C9), Example E7 can achieve higher glass transition temperature and lower coefficient of thermal expansion at the same time and can achieve a T288 thermal resistance of greater than 120 minutes without delamination.

Overall, a comparison of Examples E1-E11 and Comparative Examples C1-C10 shows that Examples E1-E11 can all surprisingly achieve at the same time a dissipation factor of less than or equal to 0.0015, a glass transition temperature (DMA Tg) of greater than or equal to 200° C. and a Z-axis coefficient of thermal expansion of less than or equal to 50 ppm/° C.

The above detailed description is merely illustrative in nature and is not intended to limit the embodiments of the subject matter or the applications and uses of such embodiments. As used herein, the term "exemplary" or "example" means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, the scope defined by the claims includes known equivalents and foreseeable equivalents at the time of filing this patent application.

What is claimed is:

1. A prepolymer prepared by subjecting a compound of Formula (I) and a vinyl-containing compound to a prepolymerization reaction,

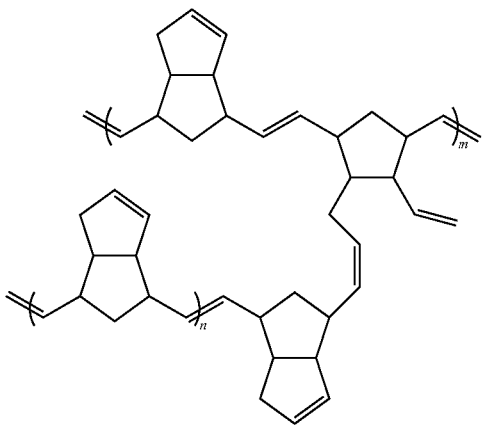

Formula (I)

wherein:
m and n are individually an integer of 1 to 10;
the vinyl-containing compound comprises bis(vinylphenyl) ethane, divinylbenzene, modification of divinylbenzene or a combination thereof; and
a ratio in part by weight of the compound of Formula (I) to the vinyl-containing compound in the prepolymerization reaction is 8:2 to 6:4.

2. The prepolymer of claim 1, wherein the modification of divinylbenzene comprises a copolymer, a prepolymer or a derivative of the divinylbenzene and a following component: methyl methacrylate resin, triallyl isocyanurate resin, triallyl cyanurate resin, ethylstyrene or a combination thereof.

3. The prepolymer of claim 1, wherein the prepolymerization reaction is performed in the presence of a reaction initiator, and a content of the reaction initiator is 0.001 to 1 part by weight relative to a total of 100 parts by weight of the compound of Formula (I) and the vinyl-containing compound.

4. The prepolymer of claim 3, wherein the reaction initiator comprises a Grubbs catalyst, a metal chloride or a combination thereof.

5. The prepolymer of claim 4, wherein the Grubbs catalyst comprises (1,3-bis-(2,4,6-trimethylphenyl)-2-imidazolidinylidene)dichloro(o-isopropoxyphenylmethylene)ruthenium, dichloro(o-isopropoxyphenylmethylene)(tricyclohexylphosphine) ruthenium(II) or a combination thereof.

6. The prepolymer of claim 4, wherein the metal chloride comprises aluminium chloride.

7. The prepolymer of claim 1, wherein the prepolymerization reaction has a conversion rate of between 10% and 90%.

8. The prepolymer of claim 1, wherein the prepolymerization reaction is performed at a temperature of 70 to 120° C. for 1 to 8 hours.

9. A resin composition comprising the prepolymer of claim 1 and an additive.

10. The resin composition of claim 9, comprising 20 to 108 parts by weight of the additive relative to 100 parts by weight of the prepolymer.

11. The resin composition of claim 9, wherein the additive comprises polyphenylene ether resin, maleimide resin, vinyl-containing polyolefin resin, hydrogenated polyolefin resin, bis(vinylphenyl) ethane, divinylbenzene, modification of divinylbenzene, triallyl isocyanurate, triallyl cyanurate, styrene copolymer or a combination thereof.

12. The resin composition of claim 9, further comprising flame retardant, inorganic filler, curing accelerator, solvent, polymerization inhibitor, toughening agent, coupling agent or a combination thereof.

13. An article made from the resin composition of claim 9, comprising a resin film, a prepreg, a laminate or a printed circuit board.

14. The article of claim 13, having a dissipation factor at 10 GHz as measured by reference to JIS C2565 of less than or equal to 0.0015.

15. The article of claim 13, having a glass transition temperature as measured by using a dynamic mechanical analyzer by reference to IPC-TM-650 2.4.24.4 of greater than or equal to 200° C.

16. The article of claim 13, having a Z-axis coefficient of thermal expansion as measured by using a thermomechanical analyzer by reference to IPC-TM-650 2.4.24.5 of less than or equal to 50 ppm/° C.

* * * * *